(12) United States Patent
Kim et al.

(10) Patent No.: US 9,435,970 B2
(45) Date of Patent: Sep. 6, 2016

(54) OPTICAL CONNECTOR (71) Applicant: OPTICIS CO., LTD., Gyeonggi-do (KR)

(72) Inventors: Hee Dae Kim, Gwangju (KR); Hyun Sik Lee, Gwangju (KR)

(73) Assignee: Optics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/435,406

(22) PCT Filed: Mar. 24, 2014

(86) PCT No.: PCT/KR2014/002465
§ 371 (c)(1),
(2) Date: Apr. 13, 2015

(87) PCT Pub. No.: WO2014/157895
PCT Pub. Date: Feb. 10, 2014

(65) Prior Publication Data
US 2015/0293317 A1    Oct. 15, 2015

(30) Foreign Application Priority Data
Mar. 27, 2013   (KR) .................. 10-2013-0033090

(51) Int. Cl.
*G02B 6/36*   (2006.01)
*G02B 6/42*   (2006.01)
*G02B 6/43*   (2006.01)

(52) U.S. Cl.
CPC ............ *G02B 6/4292* (2013.01); *G02B 6/423* (2013.01); *G02B 6/4214* (2013.01);
(Continued)

(58) Field of Classification Search
CPC .. G02B 6/4292; G02B 6/4214; G02B 6/423; G02B 6/4243; G02B 6/4246; G02B 6/4249; G02B 6/4255; G02B 6/4257; G02B 6/43
USPC ........................................... 385/89, 90
See application file for complete search history.

(56) References Cited

U.S. PATENT DOCUMENTS

| 6,386,768 B1 | 5/2002 | Yoon et al. | |
| 2003/0019838 A1* | 1/2003 | Shaw ................ | G02B 6/30 216/20 |

(Continued)

FOREIGN PATENT DOCUMENTS

| CN | 1273367 A | 11/2000 |
| CN | 101271175 A | 9/2008 |

(Continued)

OTHER PUBLICATIONS

Notification of the First Office Action, dated Dec. 16, 2015, in Chinese Patent Application No. 201480002876.8, 22 pages.

(Continued)

*Primary Examiner* — Jerry Blevins
(74) *Attorney, Agent, or Firm* — Nixon Peabody LLP; Khaled Shami (57) ABSTRACT

An optical connector is provided. The optical connector includes: an optical fiber line fixing block including an insertion groove in which an end portion of an optical fiber line is inserted; and a submount including first guide-walls determining a position of the optical fiber line fixing block and second guide-walls determining a position of an optical device to be connected to the optical fiber line, wherein the optical fiber line fixing block and the optical device are automatically aligned by the first guide-walls and the second guide-walls.

19 Claims, 5 Drawing Sheets

(52) U.S. Cl.
CPC ......... *G02B 6/4243* (2013.01); *G02B 6/4246* (2013.01); *G02B 6/4249* (2013.01); *G02B 6/4255* (2013.01); *G02B 6/4257* (2013.01); *G02B 6/43* (2013.01)

(56) References Cited

U.S. PATENT DOCUMENTS

| | | |
|---|---|---|
| 2008/0025674 A1 | 1/2008 | Sasaki |
| 2008/0304802 A1 | 12/2008 | Watanabe et al. |
| 2014/0010499 A1 | 1/2014 | Suematsu et al. |

FOREIGN PATENT DOCUMENTS

| | | |
|---|---|---|
| JP | 11-231189 | 8/1999 |
| JP | 2007256298 A | 10/2007 |
| JP | 2007-298887 | 11/2007 |
| JP | 2009-128777 | 6/2009 |
| KR | 10-2006-0054914 | 5/2006 |
| KR | 100904131 B1 | 6/2009 |
| WO | 2012111650 A1 | 8/2012 |

OTHER PUBLICATIONS

International Search Report mailed Jun. 18, 2014 in PCT/KR2014/002465, including English translation, 5 pages total.

Written Opinion dated mailed Jun. 18, 2014 in PCT/KR2014/002465, including English translation, 8 pages total.

Notice of Allowance mailed Aug. 20, 2014 in KR Patent Application No. 10-2013-0033090, including English translation, 8 pages total.

* cited by examiner

OPTICAL CONNECTOR

TECHNICAL FIELD

The present disclosure relates to an optical connector, and more particularly, to an optical connector for easily connecting a plurality of light-emitting devices or a plurality of light-receiving devices to a plurality of optical fiber lines.

BACKGROUND ART

In general, optical connectors are used to optically transmit digital visual interface (DVI) signals or high definition multimedia interface (HDMI) signals. Optical connectors have a structure in which a device insertion member and an optical fiber insertion member are coupled to each other. A plurality of light-receiving devices or a plurality of light-emitting devices are inserted into the device insertion member. In addition, optical fiber lines are inserted into the optical fiber insertion member.

Such optical connectors are required to align optical fiber lines with light ports of light-receiving or light-emitting devices for a precisely facing relationship therebetween. For this, methods such as a precise device aligning method using a flip chip bonder or a die bonder, or a method using an apparatus such as an active aligning apparatus are used. However, these methods are disadvantageous because expensive equipment or complex processes are used.

DETAILED DESCRIPTION OF THE INVENTION

Technical Problem

To solve the above-mentioned problems of the related art, the present disclosure provides an optical connector for easily connecting optical fiber lines to light-receiving or light-emitting devices in an assembly process.

Technical Solution

According to an embodiment of the present invention, there is provided an optical connector including: an optical fiber line fixing block including an insertion groove in which an end portion of an optical fiber line is inserted; and a submount including first guide-walls determining a position of the optical fiber line fixing block and second guide-walls determining a position of an optical device to be connected to the optical fiber line, wherein the optical fiber line fixing block and the optical device are automatically aligned by the first guide-walls and the second guide-walls.

Advantageous Effects

The present disclosure provides an optical connector including insertion grooves, first guide-walls, and second guide-walls. Therefore, when the optical connector is assembled, optical fiber lines of an optical cable may be automatically aligned with optical devices corresponding to the optical fiber lines.

Furthermore, in the optical connector of the present disclosure, optical paths may be easily changed by varying the positions of supports, and thus the performance of the optical connector may be easily improved.

Furthermore, in the optical connector of the present disclosure, optical paths may easily be changed by adjusting the shape of a refection plate.

As described above, the optical connector of the present disclosure may be used to align optical fiber lines with optical devices without using expensive equipment, and thus the performance of the optical connector may easily be improved.

BEST MODE

According to an aspect, an optical connector includes: an optical fiber line fixing block including an insertion groove in which an end portion of an optical fiber line is inserted; and a submount including first guide-walls determining a position of the optical fiber line fixing block and second guide-walls determining a position of an optical device to be connected to the optical fiber line, wherein the optical fiber line fixing block and the optical device are automatically aligned by the first guide-walls and the second guide-walls.

The end portion of the optical fiber line may be fixed as being inserted into the insertion groove, and the optical fiber line fixing block and the optical device may be fixed to the submount by the first guide-walls and the second guide-walls.

The insertion groove, the first guide-walls, and the second guide-walls may be disposed at predetermined positions so that the end portion of the optical fiber line and the optical device may be disposed in line.

The first guide-walls may be disposed on both sides of the optical fiber line fixing block.

The first guide-walls may surround corners of the optical fiber line fixing block.

The first guide-walls and the second guide-walls may be formed of a polymer.

The submount may further include a substrate below the first guide-walls and the second guide-walls, and the first guide-walls and the second guide-walls may be formed of the same material as a material used to form the substrate.

The second guide-walls may be disposed on both sides of the optical device.

The insertion groove may be a gap formed between a plurality of third guide-walls.

The optical fiber line fixing block may further include a base supporting the optical fiber line.

The optical device may be a light-receiving device or a light-emitting device.

The optical device may be an edge emitting laser diode (EELD) or a vertical cavity surface emitting laser (VCSEL) diode.

The optical device may include an array of a plurality of light-receiving devices or light-emitting devices.

According to an aspect, an optical connector connects a plurality of optical fiber lines and a plurality of optical devices, the optical connector including: a reflection plate disposed on end portions of the optical fiber lines; an optical fiber fixing block including insertion grooves in which end portions of the optical fiber lines are inserted; and a submount including first guide-walls determining a position of the optical fiber fixing block and second guide-walls determining positions of the optical devices.

The insertion grooves, the first guide-walls, and the second guide-walls may be disposed at predetermined positions so that the end portions of the optical fiber lines and the optical devices may be disposed in line.

The optical connector may further include supports disposed on upper portions of the optical devices so as to support the reflection plate.

An angle of the reflection plate may be adjusted according to positions of the supports.

Optical paths connecting the optical fiber lines and the optical devices may be varied according to positions of the supports.

The reflection plate may include a groove formed in a portion placed on the end portions of the optical fiber lines.

The groove of the reflection plate may be shaped like a recess having a wider upper side than a lower side thereof.

The reflection plate may be fixed using epoxy.

The end portions of the optical fiber lines may be fixed as being inserted into the insertion grooves, the optical fiber line fixing block and the optical devices may be fixed to the submount by the first guide-walls and the second guide-walls, and epoxy may be further included between the optical fiber lines and the insertion grooves and between the optical devices and the submount.

The optical devices may be VCSELs.

MODE OF THE INVENTION

Hereinafter, exemplary embodiments of the present invention will be described in detail with reference to the accompanying drawings. In the drawings, like reference numerals refer to like elements, and the size of each element may be exaggerated for clarity of illustration.

Figure 1:
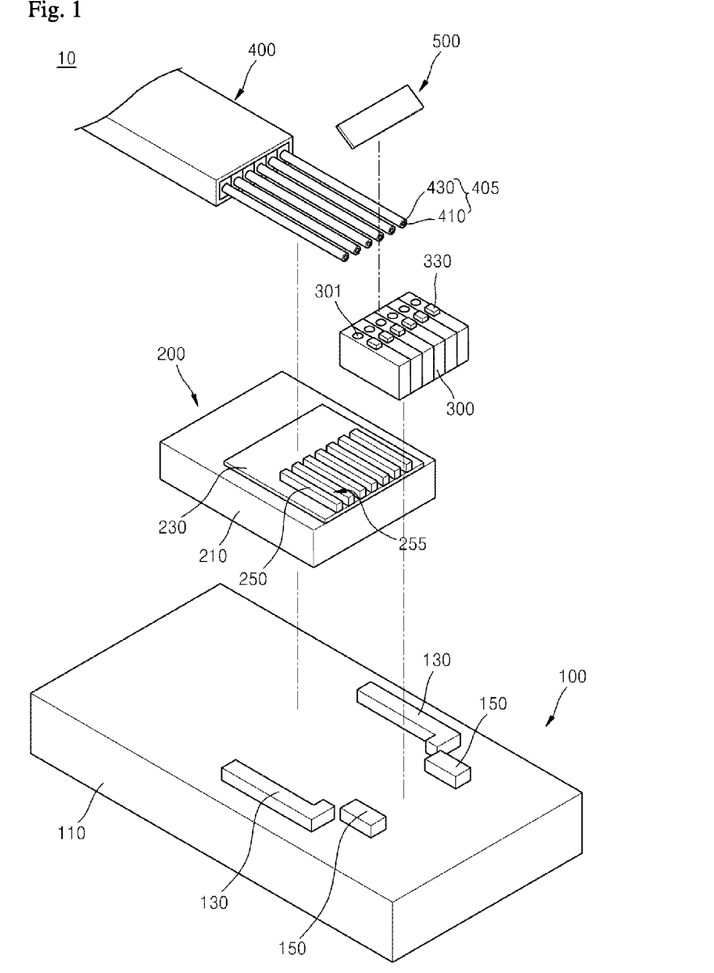
FIG. 1 is an exploded perspective view illustrating a connection structure of an optical connector according to an embodiment of the present disclosure.
Figure 2A:
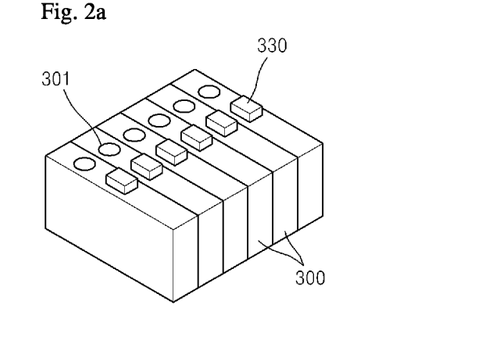
FIGS. 2A and 2B are perspective view illustrating optical devices and supports applicable in the embodiment of the present disclosure.
Figure 2B:
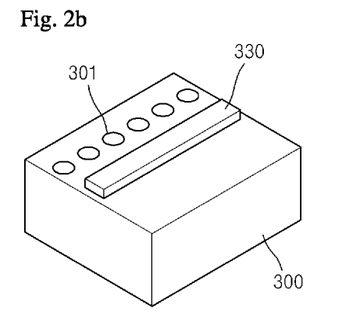
Figure 3:
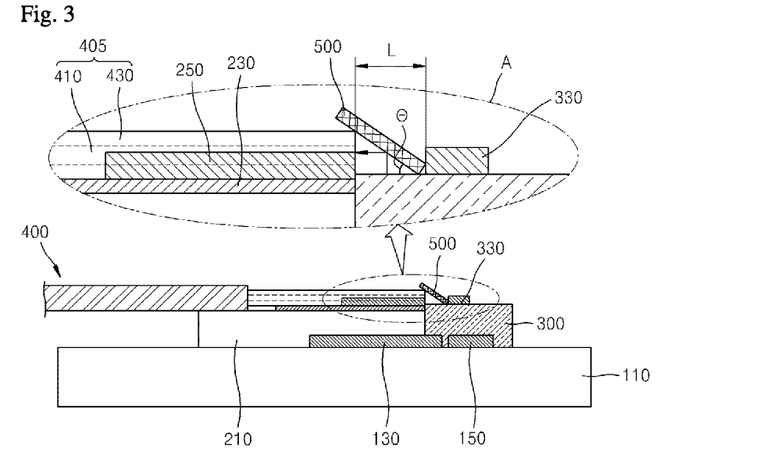
FIG. 3 is a cross-sectional view illustrating a connected state by the optical connector of FIG. 1.
Figure 4:
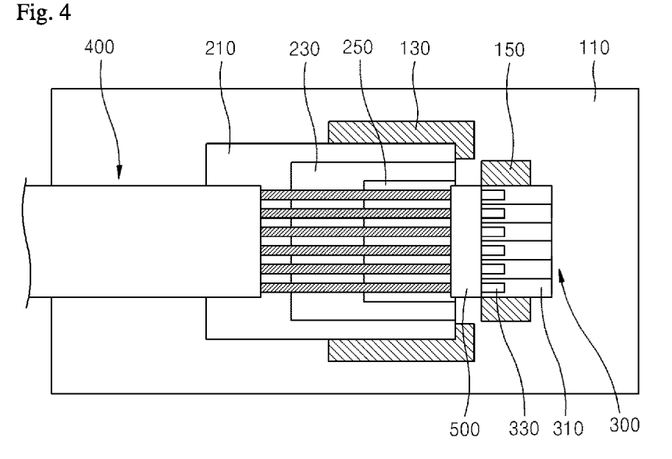
FIG. 4 is a plan view illustrating the connected state by the optical connector of FIG. 1.

FIG. 1 is an exploded perspective view illustrating a connection structure of an optical connector according to an embodiment of the present disclosure. FIGS. 2A and 2B are perspective view illustrating optical devices 300 and supports 330 applicable in the embodiment of the present disclosure. FIG. 3 is a cross-sectional view illustrating a connected state by the optical connector of FIG. 1. FIG. 4 is a plan view illustrating the connected state by the optical connector of FIG. 1. In the drawings, like reference numerals refer to like elements, and descriptions thereof will not be repeated for clarity of illustration.

Referring to FIGS. 1 to 4, the optical connector of the embodiment of the present disclosure is used to connect optical fiber lines 405 of an optical cable 400 to the optical devices 300. The optical connector includes a reflection plate 500, the supports 330, an optical fiber line fixing block 200, and a submount 100.

The optical cable 400 may include the optical fiber lines 405. Each of the optical fiber lines 405 includes a core 410 through which light propagates, and a cladding layer 430 surrounding the core 410.

The optical devices 300 may be light-emitting devices capable of emitting light or light-receiving devices capable of receiving light and converting the light into electric signals. In some embodiments, the optical devices 300 may be vertical cavity surface emitting lasers (VCSELs). In some embodiments, the optical devices 300 may laser diodes capable of emitting light having a wavelength of about 850 nm. In other embodiments, the optical devices 300 may be photo detectors (PDs).

Referring to FIG. 2A, the optical devices 300 connected to the optical connector of the embodiment may be provided as an array. Alternatively, as shown in FIG. 2B, the optical devices 300 may be provided in the form of a single chip including a plurality of light ports 301. In FIG. 2A, six optical devices 300 are illustrated. However, the number of the optical devices 300 is not limited thereto. For example, the optical devices 300 may be provided as an n×1 array (n refers to the number of optical devices). Alternatively, the optical devices 300 may be provided as a combination of an array and a single chip.

Owing to the reflection plate 500, the cores 410 of the optical fiber lines 405 and light ports of the optical devices 300 may be placed along optical paths. In other words, if the optical devices 300 are light-emitting devices, light emitted from the optical devices 300 may be reflected by the reflection plate 500 to the cores 410 of the optical fiber lines 405. In addition, if the optical devices 300 are light-receiving devices, light exiting from the optical fiber lines 405 may be reflected by the reflection plate 500 to the optical devices 300.

One side of the reflection plate 500 is placed on end portions of the optical fiber lines 405, and the other side of the reflection plate 500 is supported by the supports 330. A region in which the reflection plate 500 and the supports 330 are connected to each other may be treated with epoxy so as to fix the reflection plate 500.

The supports 330 may support the reflection plate 500. The supports 330 may be disposed on upper surfaces of the optical devices 300.

Referring to FIG. 2A, the supports 330 are disposed on the optical devices 300, respectively. The number of the supports 330 may be two or more. Referring to FIG. 2B, the optical devices 300 are provided in the form of a single chip including a plurality of light ports 301. In this case, the supports 330 may be provided in the form of a long single body.

The angle of the reflection plate 500 may be adjusted according to the positions of the supports 330 for varying the lengths of the optical paths. This will be described later in more detail.

In some embodiments, upper portions of the optical devices 300 may be coated with a polymer, and the polymer may be patterned by photolithography so as to form the supports 330. In other words, a pattern having the shapes of the supports 330 may be formed through a polymer coating process, an exposure process using a mask, a developing process, and a hard baking process. However, the supports 330 are not limited thereto. For example, the supports 330 may be separately manufactured and may then be attached to the upper portions of the optical devices 300, or portions of the optical devices 300 may be etched to form the supports 330.

The optical fiber line fixing block 200 may include insertion grooves 225 for fixing the optical fiber lines 405. In addition, the optical fiber line fixing block 200 may further include a block substrate 210 and a base 230 for supporting the optical fiber lines 405.

The insertion grooves 225 may be formed by a plurality of guide-walls 250 so that the optical fiber lines 405 may be inserted therein. That is, gaps between the guide-walls 250 may be the insertion grooves 225. The positions of the insertion grooves 225 may be determined in such a manner that the end portions of the optical fiber lines 405 and the light ports of the optical devices 300 may be arranged in line.

The guide-walls 250 are disposed in the length direction of the optical fiber lines 405 to guide the positions of the optical fiber lines 405. In some embodiments, the guide-walls 250 may be formed by a method identical or similar to the method used to form the supports 330. That is, a photolithography method may be used, or the optical fiber line fixing block 200 may be directly etched. Alternatively, the optical fiber line fixing block 200 including the guide-walls 250 may be formed by an injection molding method. Therefore, the guide-walls 250 and the optical fiber line fixing block 200 may be formed in one piece by using the same material.

Epoxy may be applied between the optical fiber lines 405 and the insertion grooves 225 for fixing the optical fiber lines 405 and the insertion grooves 225.

The block substrate 210 may be formed of a material such as a silicon wafer, a GaAs wafer, glass, a metal, and a plastic material.

The base 230 supports the optical fiber lines 405. In other words, the base 230 may compensate for a high difference of a portion of the optical cable 400 from which a jacket is removed, and thus the optical fiber lines 405 may not be bent. In some embodiments, the base 230 may be formed of a polymer. The base 230 may be formed by using a photolithograph method or etching the optical fiber line fixing block 200.

The submount 100 includes first guide-walls 130 determining the position of the optical fiber line fixing block 200, and second guide-walls 150 determining the position of the optical devices 300. The first and second guide-walls 130 and 150 are disposed on a substrate 110.

The substrate 110 may be formed of a material such as a silicon wafer, a GaAs wafer, glass, a metal, and a plastic material.

The positions of the first guide-walls 130 and the second guide-walls 150 may be preset so that the optical fiber lines 405 and the light ports of the optical devices 300 may be arranged in line.

The first guide-walls 130 determine the position of the optical fiber line fixing block 200. The first guide-walls 130 may be disposed on both sides of the optical fiber line fixing block 200 so that the optical fiber line fixing block 200 may be inserted between the first guide-walls 130 being two in number. In some embodiments, the first guide-walls 130 may be disposed to surround corners of the optical fiber line fixing block 200.

The second guide-walls 150 determine the position of the optical devices 300. The second guide-walls 150 may be disposed on both sides of the optical devices 300 or an array of the optical devices 300 so that the optical devices 300 or the array of the optical devices 300 may be inserted between the second guide-walls 150 being two in number.

In the drawings, the first guide-walls 130 and the second guide-walls 150 are separate. However, the first guide-walls 130 and the second guide-walls 150 may be formed in one piece.

In some embodiments, the first guide-walls 130 and/or the second guide-walls 150 may be formed of a polymer such as SU-8. However, the first guide-walls 130 and the second guide-walls 150 are not limited thereto. In some embodiments, the first guide-walls 130 and/or the second guide-walls 150 may be formed of the same material as that used to form the substrate 110.

In some embodiments, the first guide-walls 130 and/or the second guide-walls 150 may be formed by applying a polymer to the substrate 110 and patterning the polymer into the first guide-walls 130 and/or the second guide-walls 150 through a photolithograph process. That is, the first guide-walls 130 and/or the second guide-walls 150 may be formed through a polymer applying process, an exposure process using a mask, a developing process, and a hard baking process. The first guide-walls 130 and/or the second guide-walls 150 may be formed at the same time.

In other embodiments, the substrate 110 may be wet-etched or dry-etched to form the first guide-walls 130 and/or the second guide-walls 150. In other embodiments, the substrate 110, the first guide-walls 130, and the second guide-walls 150 may be formed in one piece by using a die. That is, the submount 100 may be an injection-molded part.

Epoxy may be applied between the optical fiber line fixing block 200 and the substrate 110 or between the optical devices 300 and the substrate 110 as a fixing material. For example, the optical devices 300 may be fixed to the substrate 110 by epoxy.

That is, the end portions of the optical fiber lines 405 are fixed to the insertion grooves 225 of the optical fiber line fixing block 200, the optical fiber line fixing block 200 is disposed between the first guide-walls 130 of the submount 100, and the optical devices 300 are disposed between the second guide-walls 150.

The positions of the first guide-walls 130, the second guide-walls 150, and the insertion grooves 225 or the guide-walls 250 are preset so that the optical fiber lines 405 and the optical devices 300 may be arranged in line.

Therefore, as shown in FIGS. 3 and 4, when the optical connector of the embodiment is assembled, the optical fiber lines 405 of the optical cable 400 may be automatically aligned with the optical devices 300 corresponding to the optical fiber lines 405.

Portion A of FIG. 3 is an enlarged cross-sectional view illustrating an aligned state of the optical fiber lines 405 and the optical devices 300 by the optical connector. For clarity of illustration, it is assumed that the optical devices 300 are light-emitting devices.

Referring to Portion A of FIG. 3, the reflection plate 500 adjusts optical paths so that light emitted from the optical devices 300 may enter the cores 410 of the optical fiber lines 405. The angle θ between the reflection plate 500 and the upper surfaces of the optical devices 300 may be varied by adjusting a length L between the end portions of the optical fiber lines 405 and the supports 330. In this manner, optical paths may be adjusted.

Figure 5A:
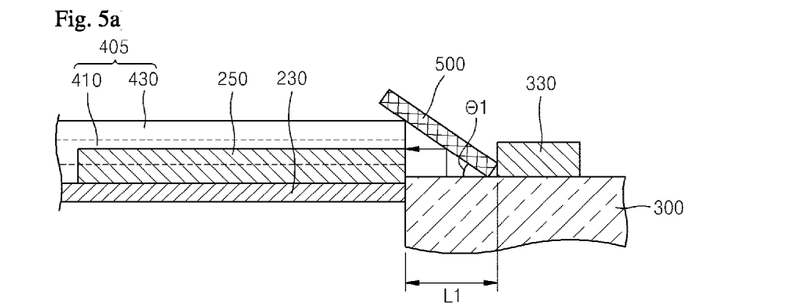
FIGS. 5A to 5C are views illustrating optical paths varying according to the positions of supports.
Figure 5B:
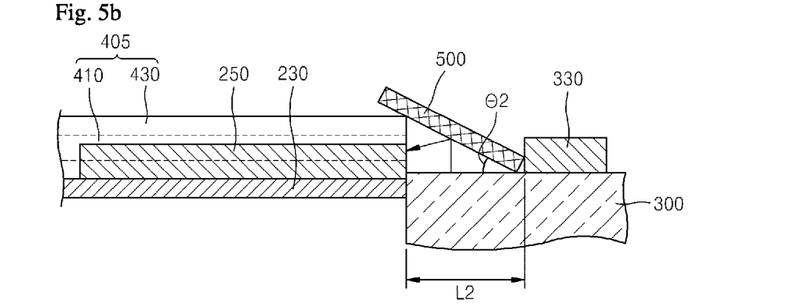
Figure 5C:
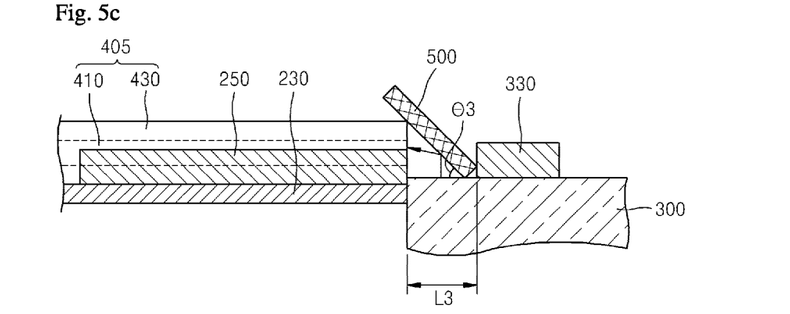

FIGS. 5A to 5C are views illustrating optical paths varying according to the positions of the supports 330. In FIGS. 5A to 5C, light exits of the optical devices 300, that is, regions though which light exits, are not varied.

Referring to FIG. 5A, the reflection plate 500 has a first angle θ1 with respect to the upper surfaces of the optical devices 300, and the end portions of an optical fiber lines 405 and the supports 330 are spaced away from each other by a first length L1. In this case, most light emitted from the optical devices 300 is vertically incident on end surfaces of the cores 410 of the optical fiber lines 405.

In the optical paths shown in FIG. 5A, the amount of light incident on the cores 410 may be large. However, if light is vertically incident on the cores 410, the light may be reflected again by the cores 410 and may interfere with light emitted from the optical devices 300. The amount of light incident on the cores 410 and an allowable range of light interference may be properly adjusted according to the purpose of the optical cable 400.

The amount of light incident on the cores 410 and the amount of light interference may be adjusted by varying the optical paths. In the present disclosure, the optical paths may be adjusted by changing the positions of the supports 330.

Referring to FIG. 5B, the reflection plate 500 has a second angle θ2 with respect to the upper surfaces of the optical devices 300, and the end portions of the optical fiber lines 405 and the supports 330 are spaced away from each other by a second length L2.

The second length L2 is greater than the first length L1, and thus the second angle θ2 is smaller than the first angle θ1. In this case, the amount of light emitted from the optical devices 300 and vertically incident on the end surfaces of the cores 410 is reduced, and thus the amount of light reflected back to the optical devices 300 is markedly reduced. Therefore, the interference between re-reflected light and light emitted from the optical devices 300 may be reduced.

Referring to FIG. 5C, the reflection plate 500 has a third angle θ3 with respect to the upper surfaces of the optical devices 300, and the end portions of the optical fiber lines 405 and the supports 330 are spaced away from each other by a third length L3.

The third length L3 is shorter than the first length L1, and thus the third angle θ3 is greater than the first angle θ1. In this case, the amount of light emitted from the optical devices 300 and vertically incident on the end surfaces of the cores 410 is reduced, and thus the amount of light reflected back to the optical devices 300 is markedly reduced. Therefore, the interference between light re-reflected by the cores 410 and light emitted from the optical devices 300 may be reduced.

In this manner, the positions of the supports 330 may be determined in consideration of the amount of light and the amount of light interference. That is, the design of the supports 330 of the optical connector of the present disclosure may be easily varied according to the purpose of the optical connector or the like.

Figure 6A:
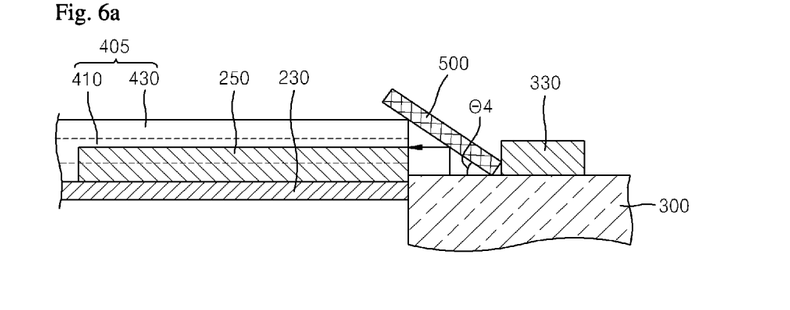
FIGS. 6A and 6B are views illustrating optical paths varying according to the position of a reflection surface of a reflection plate.
Figure 6B:
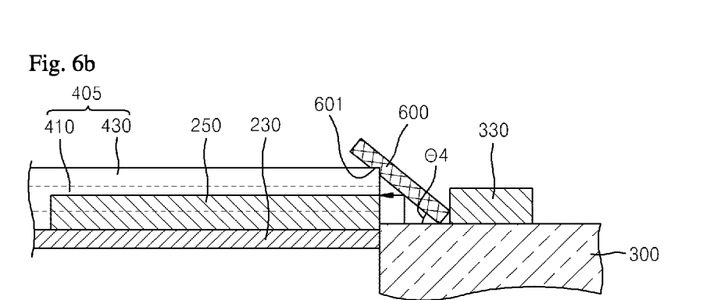

FIGS. 6A and 6B are views illustrating optical paths varying according to the position of a reflection surface of the reflection plate 500. FIG. 6A illustrates the reflection plate 500 not including a groove in the reflection surface thereof, and FIG. 6B illustrates a reflection plate 600 including a groove 601 partially formed in a reflection surface thereof.

Referring to FIGS. 6A and 6B, the refection plate 600 illustrated in FIG. 6B is different from the reflection plate 500 illustrating in FIG. 6A in that the refection plate 600 includes the groove 601. The groove 601 is placed on the end portions of the optical fiber lines 405. Owing to the groove 601, the refection plate 600 may maintain angle θ with the upper surfaces of the optical devices 300 and may shorten optical paths along which light emitted from the optical devices 300 travels to the cores 410. In this case, the positions of the supports 330 may be accordingly varied.

Figure 7A:
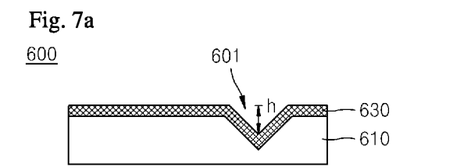
FIGS. 7A and 7B are views illustrating shapes of the reflection plate applicable to the case shown in FIG. 6B.
Figure 7B:
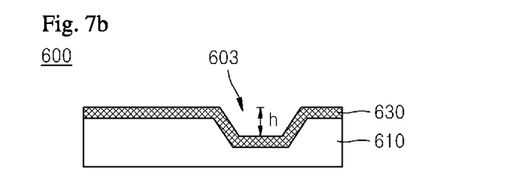

FIGS. 7A and 7B are views illustrating shapes of the reflection plate 600 applicable to the case shown in FIG. 6B.

Referring to FIGS. 7A and 7B, the refection plate 600 includes a reflection layer 630 formed on a substrate 610. An upper surface of the reflection layer 630 is a reflection surface. In addition, the refection plate 600 includes a groove 601 or 603 formed in a portion of the reflection surface. In some embodiments, the substrate 610 may be a silicon wafer. The reflection layer 630 may be formed of a material capable of reflecting light. In some embodiments, the reflection layer 630 may include a material such as Au, Ag, Mg, Al, Pt, Pd, Ni, Nd, Ir, Cr, Li, Yb, or Ca.

The groove 601 may have a V-shape as shown in FIG. 7A for engagement with the end portions of the optical fiber lines 405. The groove 603 may be shaped like a recess having a wider upper side than a lower side thereof. In the drawings, the reflection layer 630 is formed in the groove 601 or 603. However, the reflection layer 630 may not be formed in the groove 601 or 603. In some embodiments, the groove 601 or 603 may be formed by a dry etching method, a wet etching method, or a combination thereof.

The lengths of optical paths may be adjusted by varying the depth h of the groove 601 or 603. That is, if the depth h of the groove 601 or 603 is increased, the lengths of the optical paths may be decreased.

As described above, in the optical connector of the present disclosure, optical paths may easily be adjusted by varying the shape of the refection plate 600. In other embodiments of the present disclosure, the reflection plate 500 or 600 may be formed using a die. If the reflection plate 500 or 600 is formed using a die, a light reflection surface of the reflection plate 500 or 600 may be coated with a material having a high degree of light reflectivity. In addition, reflection plate bases (not shown) may be provided on both ends of the reflection plate 500 or 600 to support the reflection plate 500 or 600. The reflection plate bases (not shown) may reach the submount 100 and may be coupled to structures such as grooves (not shown) formed in the submount 100. In this case, the supports 330 may not be provided on the upper portions of the optical devices 300. As described above, if the reflection plate 500 or 600 including the bases is formed using a die, the reflection plate 500 or 600 may have an optimal angle and shape.

Figure 8:
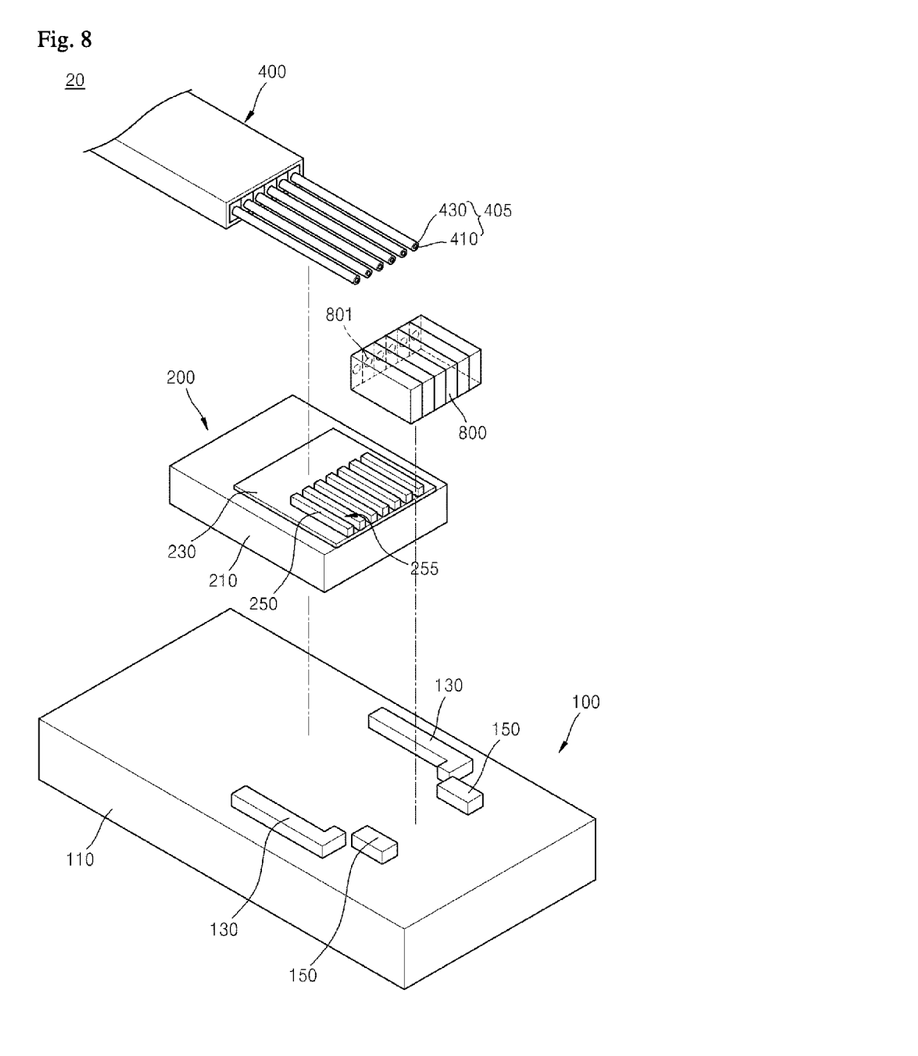
FIG. 8 is an exploded perspective view illustrating a connection structure of an optical connector according to another embodiment of the present disclosure.

FIG. 8 is an exploded perspective view illustrating a connection structure of an optical connector 20 according to another embodiment of the present disclosure. In FIG. 8, the same reference numerals as those of FIG. 1 refer to the same elements, and descriptions thereof will not be repeated for clarity.

Referring to FIG. 8, the optical connector 20 is different from the optical connector 10 illustrated in FIG. 1, in that the reflection plate 500 (refer to FIG. 1) is not used.

Light ports 801 of optical devices 800 may face end portions of optical fiber lines, and thus the optical devices 800 and the end portions of the optical fiber lines may be connected through optical paths without the reflection plate 500. That is, if the optical devices 800 are light-emitting devices, light may travel from the light ports 801 of the optical devices 800 to the end portions of the optical fiber lines through straight paths. Therefore, the optical devices 800 may not include the supports 330 illustrated in FIG. 1.

The optical devices 800 may be light-emitting devices capable of emitting light or light-receiving devices capable of receiving light and converting the light into electric signals. In some embodiments, the optical devices 800 may be edge emitting laser diodes (EELDs). In some embodiments, the optical devices 800 may laser diodes. In other embodiments, the optical devices 800 may be photo detectors (PDs).

In the current embodiment, the optical devices 800 connected to the optical connector 20 may be provided as an array. Alternatively, the optical devices 800 may be provided in the form of a single chip including a plurality of light ports 801. For example, the optical devices 800 may be provided as an n×1 array (n refers to the number of optical devices). Alternatively, the optical devices 800 may be provided as a combination of an array and a single chip.

As described above, when the optical connector of the present disclosure is assembled, optical fiber lines of an optical cable and optical devices corresponding to the optical fiber lines may be automatically aligned.

The optical connectors of the embodiments of the present disclosure have been described with reference to the accompanying drawings for illustrative purposes only, and it will be understood by those of ordinary skill in the art that various changes and other equivalent embodiments may be made therefrom.

The invention claimed is:

1. An optical connector comprising:
   an optical fiber line fixing block comprising an insertion groove in which an end portion of an optical fiber line is inserted; and
   a submount comprising a single plane on which the optical fiber line fixing block and an optical device to be connected to the optical fiber line are disposed together, and comprising first guide-walls determining a position of the optical fiber line fixing block by surrounding the optical fiber line fixing block and second guide-walls determining a position of an optical device by surrounding the optical device,
   wherein the optical fiber line fixing block and the optical device are automatically aligned by the first guide-walls and the second guide-walls,
   wherein the insertion groove is a gap formed between a plurality of third guide-walls formed of different materials from the optical fiber line fixing block and protrude from the optical fiber line fixing block,
   wherein the first guide-walls and the second guide-walls are formed of different materials from the submount and protrude from the single plane of the submount,
   wherein the first guide-walls and the second guide-walls are located at positions outside an optical path connecting the optical fiber line and the optical device,
   wherein the optical connector further comprises a reflection plate disposed on an end portion of the optical fiber line, and a support disposed on an upper portion of the optical device so as to support the reflection plate,
   wherein an angle of the reflection plate with respect to a longitudinal end surface of the optical fiber line is a function of the position of the support.

2. The optical connector of claim 1, wherein the end portion of the optical fiber line is fixed as the end portion of the optical fiber line is inserted into the insertion groove, and
   the optical fiber line fixing block and the optical device are fixed to the submount by the first guide-walls and the second guide-walls.

3. The optical connector of claim 1, wherein the insertion groove, the first guide-walls, and the second guide-walls are disposed at predetermined positions so that the end portion of the optical fiber line and the optical device are disposed in line.

4. The optical connector of claim 1, wherein the first guide-walls are disposed on both sides of the optical fiber line fixing block.

5. The optical connector of claim 1, wherein the first guide-walls surround corners of the optical fiber line fixing block.

6. The optical connector of claim 1, wherein the first guide-walls and the second guide-walls are formed of a polymer.

7. The optical connector of claim 1, wherein the second guide-walls are disposed on both sides of the optical device.

8. The optical connector of claim 1, wherein the optical fiber line fixing block further comprises a base supporting the optical fiber line.

9. The optical connector of claim 1, wherein the optical device is a light-receiving device or a light-emitting device.

10. The optical connector of claim 1, wherein the optical device is an edge emitting laser diode (EELD) or a vertical cavity surface emitting laser (VCSEL) diode.

11. The optical connector of claim 1, wherein the optical device comprises an array of a plurality of light-receiving devices or light-emitting devices.

12. An optical connector connecting a plurality of optical fiber lines and a plurality of optical devices, the optical connector comprising:
    a reflection plate disposed on end portions of the optical fiber lines;
    an optical fiber fixing block comprising insertion grooves in which end portions of the optical fiber lines are inserted; and
    a submount comprising first guide-walls determining a position of the optical fiber fixing block by surrounding the optical fiber line fixing block and second guide-walls determining positions of the optical devices by surrounding the optical devices,
    wherein the submount further comprises a single plane on which the optical fiber line fixing block and the optical devices to be connected to the optical fiber lines are disposed,
    wherein the first guide-walls and the second guide-walls are formed of different materials from the submount and protrude from the single plane of the submount,
    wherein the first guide-walls and the second guide-walls are located at positions outside an optical path connecting the optical fiber lines and the optical devices,
    wherein the optical connector further comprises supports disposed on upper portions of the optical devices so as to support the reflection plate,
    wherein an angle of the reflection plate with respect to longitudinal end surfaces of the optical fiber lines is a function of the positions of the supports.

13. The optical connector of claim 12, wherein the insertion grooves, the first guide-walls, and the second guide-walls are disposed at predetermined positions so that the end portions of the optical fiber lines and the optical devices are disposed in line.

14. The optical connector of claim 12, wherein optical paths connecting the optical fiber lines and the optical devices vary according to positions of the supports.

15. The optical connector of claim 12, wherein the reflection plate comprises a groove formed in a portion placed on the end portions of the optical fiber lines.

16. The optical connector of claim 15, wherein the groove of the reflection plate is shaped like a recess having a wider upper side than a lower side thereof.

17. The optical connector of claim 12, wherein the reflection plate is fixed using epoxy.

18. The optical connector of claim 12, wherein the end portions of the optical fiber lines are fixed as the end portions of the optical fiber lines are inserted into the insertion grooves, the optical fiber line fixing block and the optical devices are fixed to the submount by the first guide-walls and the second guide-walls, and epoxy is further included between the optical fiber lines and the insertion grooves and between the optical devices and the submount.

19. The optical connector of claim 12, wherein the optical devices are VCSELs.

\* \* \* \* \*